United States Patent
Tamura

(10) Patent No.: US 9,046,671 B2
(45) Date of Patent: Jun. 2, 2015

(54) COMPOSITE OPTICAL FIBER CABLE AND COMPOSITE OPTICAL FIBER CABLE ASSEMBLY PROVIDING PROTECTION BY FLEXURE

(75) Inventor: Mitsuaki Tamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 355 days.

(21) Appl. No.: 13/104,499

(22) Filed: May 10, 2011

(65) Prior Publication Data

US 2011/0280527 A1 Nov. 17, 2011

(30) Foreign Application Priority Data

May 14, 2010 (JP) .................................. 2010-111998
May 14, 2010 (JP) .................................. 2010-112006

(51) Int. Cl.
*G02B 6/44* (2006.01)

(52) U.S. Cl.
CPC ............ *G02B 6/4416* (2013.01); *G02B 6/4433* (2013.01)

(58) Field of Classification Search
None
See application file for complete search history.

(56) References Cited

U.S. PATENT DOCUMENTS

| | | | | |
|---|---|---|---|---|
| 4,820,012 | A * | 4/1989 | Asai .............................. | 385/101 |
| 4,895,426 | A | 1/1990 | Pinson | |
| 5,237,635 | A * | 8/1993 | Lai ................................ | 385/101 |
| 5,821,466 | A * | 10/1998 | Clark et al. ............... | 174/113 R |
| 6,882,785 | B2 * | 4/2005 | Eichelberger et al. ........ | 385/101 |
| 7,065,604 | B2 * | 6/2006 | Konda et al. .................. | 710/315 |
| 7,558,460 | B2 | 7/2009 | Yamaguchi et al. | |
| 7,860,362 | B2 * | 12/2010 | Varkey et al. ................. | 385/105 |
| 2004/0158662 | A1 | 8/2004 | Konda et al. | |
| 2004/0190842 | A1 * | 9/2004 | Rhoney et al. ................ | 385/106 |
| 2004/0197058 | A1 * | 10/2004 | Eichelberger et al. ........ | 385/101 |
| 2005/0201682 | A1 * | 9/2005 | Hosono et al. .................. | 385/37 |
| 2006/0228080 | A1 | 10/2006 | Letch et al. | |
| 2009/0046983 | A1 * | 2/2009 | Varkey et al. ................. | 385/113 |
| 2010/0098382 | A1 | 4/2010 | Tamura et al. | |
| 2011/0280527 | A1 * | 11/2011 | Tamura ......................... | 385/101 |

FOREIGN PATENT DOCUMENTS

| | | |
|---|---|---|
| CN | 1521598 A | 8/2004 |
| CN | 2807419 Y | 8/2006 |

(Continued)

OTHER PUBLICATIONS

Japanese Office Action of the corresponding Japanese Patent Application No. 2010-112006, dated Feb. 4, 2014.

(Continued)

*Primary Examiner* — Andrew Jordan
(74) *Attorney, Agent, or Firm* — Global IP Counselors, LLP

(57) ABSTRACT

A composite optical fiber cable has coated optical fibers and electric wires disposed inside a sheath. The optical fibers are enclosed within a first protective tube that is situated at the cross-sectional center, while the electric wires are disposed between the first protective tube and the sheath, and are capable of moving in the circumferential direction of the first protective tube. A composite optical fiber cable assembly includes a composite optical fiber cable and a connector attached to the cable. Inside the connector, a wiring portion for wiring the optical fiber to a ferrule and a wiring portion for wiring the electric wire to an electric terminal are disposed within a common space S inside a housing, and at least the wiring portion of the optical fiber which lies inside the space S is covered by a second protective tube.

12 Claims, 2 Drawing Sheets

(56) References Cited

FOREIGN PATENT DOCUMENTS

| CN | 1929043 A | 3/2007 |
|---|---|---|
| CN | 1975488 A | 6/2007 |
| JP | 60-165906 U | 11/1985 |
| JP | 62-150817 U | 9/1987 |
| JP | 62-222517 A | 9/1987 |
| JP | 63-4504 A | 1/1988 |
| JP | 63-194417 U | 12/1988 |
| JP | 02-168514 A | 6/1990 |
| JP | 07-306342 A | 11/1995 |
| JP | 11-337786 A | 12/1999 |
| JP | 2004-206042 A | 7/2004 |
| JP | 2004-265780 A | 9/2004 |
| JP | 2007-025272 A | 2/2007 |
| JP | 2008-203409 A | 9/2008 |

OTHER PUBLICATIONS

Chinese Office Action of the corresponding Chinese Patent Application No. 201110129712.x, dated Jul. 30, 2014.

* cited by examiner

COMPOSITE OPTICAL FIBER CABLE AND COMPOSITE OPTICAL FIBER CABLE ASSEMBLY PROVIDING PROTECTION BY FLEXURE

BACKGROUND OF THE INVENTION

1. Technical Field

The present invention relates to a composite optical fiber cable that includes electric wires and an optical fiber, and to a composite optical fiber cable assembly that includes the composite optical fiber cable and a connecting portion.

2. Background Art

Japanese Unexamined Patent Application 2007-25272 discloses an optical digital visual interface (DVI) cable compliant with the DVI transmission interface standard and designed to connect electronic devices, for example, a projector and a PC, or a tuner and a display such as a plasma display. The optical DVI cable is composed of a transmission module, a reception module, and a composite optical fiber cable. The composite optical fiber cable has a plurality of optical fibers, a plurality of metal wires, tensile fibers, and a sheath covering these elements. The optical fibers carry an optical signal from the transmission module to the reception module. According to one known composite optical fiber cable assembly, in a connector provided at ends of a composite optical fiber cable, optical fibers are wired to a ferrule and held in a bundle, while metal wires are wired to a metal contact and connected therewith.

DISCLOSURE OF THE INVENTION

An object of the present invention is to provide a composite optical fiber cable designed to prevent lateral pressure from bearing on the optical fiber even during flexion of the cable, and capable of maintaining the transmission characteristics of the optical fiber. A further object is to provide a composite optical fiber cable assembly adapted to prevent the electric wires from contacting the optical fiber in wiring portions to the ferrule and to the metal contact, and able to maintain the transmission characteristics of the optical fiber.

To achieve the object, the present invention provides a composite optical fiber cable including: a flexible sheath having an elongated cylindrical shape; a first protective tube disposed within the sheath and extending the length of the sheath, the first protective tube being centrally located within the sheath viewed in cross-section; at least one optical fiber disposed within the first protective tube extending the length of the first protective tube and the sheath; and electric wires disposed within the sheath extending the length of the sheath and arranged between an inner surface of the sheath and an outer surface of the first protective tube such that the electric wires are movable within the sheath relative to a circumferential direction of the first protective tube.

In one embodiment of the composite optical fiber cable of the present invention, an at least an outer surface of the first protective tube may formed with a fluororesin. The electric wires may be arranged in a twisted manner about the perimeter of the first protective tube defining a helical shape. Also, the electric wires may be arranged within the sheath such that in response to flexing of the composite optical fiber cable, the electric wires move in circumferential directions relative to the first protective tube causing the sheath to elastically deform from a circular shape to an elliptical shape in the area of the flexing with the first protective tube retaining a generally circular shape when viewed in cross-section.

Another aspect of the invention provides a composite optical fiber cable assembly including: a composite optical fiber cable having an optical fiber and electric wires covered by a sheath; a housing having a hollow interior, the housing being fixed to an open end of the composite optical fiber with an exposed portion of the optical fiber extending out of the sheath into the hollow interior of the housing, the electric wires also extend out of the sheath and into the hollow interior of the housing, and the optical fiber being covered by a second protective tube within a part of the hollow interior; and a terminal portion fixed to the housing with an exposed portion of the optical fiber being connected to a ferrule within the terminal portion and the electric wires being connected to electric terminals within the terminal portion.

In the composite optical fiber cable assembly of the present invention, optionally, the hollow interior of the housing is filled with a resin such that the portions of the electric wires and the portion the optical fiber that extend through the housing are surrounded by and integrally molded to the terminal portion and the hollow interior of the housing by the resin. In other words, a resin is used to integrally mold portions where the electric wires are connected to the terminal portion, and portions where the optical fiber wiring is covered by the second protective tube.

The composite optical fiber cable of the present invention prevents lateral pressure from bearing on the optical fiber even if the cable is flexed at a small flexure radius, and is able to maintain transmission characteristics. Additionally, damage or increased transmission loss of the optical fiber in the wiring portion can be prevented.

DETAILED DESCRIPTION OF THE INVENTION

Figure 1:
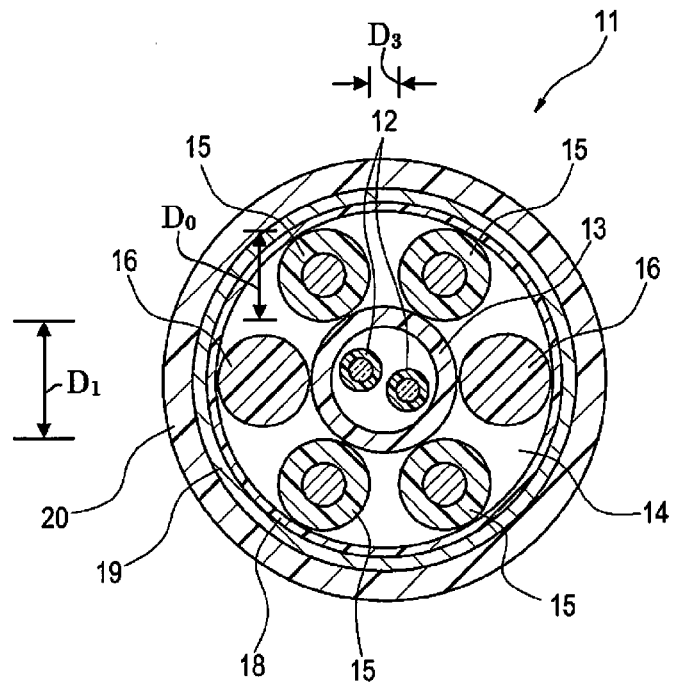
FIG. 1 is a cross sectional view showing an embodiment of the composite optical fiber cable according to the invention.

Embodiments of the present invention are described below with reference to the drawings. The drawings are intended for illustrative purposes, and are not limiting the invention. In the drawings, in order to avoid redundant description, like symbols indicate like components. Dimensional proportions in the drawings are not necessarily accurate.

In conventional composite optical fiber cables, optical fibers, metal wires, and tensile fibers are tightly bundled inside a sheath. The inventors have found that, for this reason, if the composite optical fiber cable is bent, the transverse section of the sheath is deformed to elliptical shape, that at the inside of the sheath, the optical fibers push the metal wires and the tensile fibers in the direction of the minor axis of the ellipse. Therefore, the inventors have found that possibly there are risks in increasing transmission loss by lateral pressure affecting on the optical fibers. The inventors have also found that even in a case where a protective coating is provided to the optical fibers, or the optical fibers are protected by being covered by a tube, if the composite optical fiber cable is flexed at a small flexure radius, the protective coating or tube can be crushed by the metal wires or tensile fibers, unavoidably resulting in lateral pressure acting on the optical fiber.

In a conventional composite optical fiber cable assembly, the wiring portion where the optical fiber connects with the ferrule and the wiring portion where the metal wire connects with a metal contact are separated by a partitioning wall; however, in terms of size reduction of the wiring portion, it is preferable to omit the partitioning wall. However, by doing so, there are risks of the metal wire and the optical fiber coming into direct contact in the wiring portion. There are also risks that the metal wire or a tool will come into direct contact with the optical fiber during wiring operations of the optical fiber and the metal wire. If the metal wire comes into direct contact with the optical fiber in this way, there are risks of damage to the optical fiber or increased transmission loss of the optical fiber.

The above observations made by the inventors form the basis of the present invention.

FIG. 1 is a cross sectional view showing a composite optical fiber cable 11 according to the invention in a non-flexed state. The composite optical fiber cable 11 has a sheath 20 with a hollow interior, the sheath 20 constituting the outmost flexible layer, and to the inside thereof, one or a plurality of coated optical fibers 12, and a plurality of electric wires 15. Each of the electric wires 15 has an outer diameter $D_0$. The optical fibers 12 are covered by a first protective tube 13 which is disposed in the cross sectional center of the composite optical fiber cable 11. As shown in FIG. 1, the two upper ones of the electric wires 15 are spaced apart from the two lower ones of the electric wires 15 by a first distance $D_1$ in the non-flexed state. As shown in FIG. 1, the distance $D_1$ is greater than the outer distance $D_0$.

An enclosed space 14 is defined between the inside of the hollow interior of the sheath 20 and the outside of the first protective tube 13; within the enclosed space 14, for example, the plurality of electric wires 15 and a plurality of tensile fibers 16 are disposed. The electric wires 15 are, for example, twisted pair cables, coaxial cables, insulated cables, or the like, the cables having an American wire gauge (AWG) on the order of 20 to 46 according to the AWG standard. In the present example, of the four electric wires 15, two are signal wires and two are power wires. About the perimeter of the enclosed space 14 there are disposed an overall wrapping 18, a shield layer 19, and the sheath 20, in that order.

In the composite optical fiber cable 11, the electric wires 15 and the tensile fibers 16 which are enclosed in the enclosed space 14 are twisted about the perimeter of the first protective tube 13, loosely in a spiral pattern or helical pattern so as to not apply pressure to the first protective tube 13. Thereby, the electric wires 15 and the tensile fibers 16 are shiftable in the circumferential direction of the first protective tube 13, within the enclosed space 14. The depth of the enclosed space 14 (the distance between the outside perimeter of the first protective tube 13 and the inside perimeter of the overall wrapping 18) is approximately equal to or slightly larger than the diameter of the electric wires 15 and the tensile fibers 16.

The coated optical fibers 12 which are enclosed within the first protective tube 13 are glass fibers 0.125 mm in diameter composed of a core and cladding, and having a coating layer of UV curing resin formed on the periphery; the coating layer has an outside diameter of 0.25 mm, for example. Optionally, an additional coating layer to give the coated optical fibers 12 a diameter of 0.9 mm; or the coated optical fibers 12 are covered with tensile fibers and a coating layer to produce an optical fiber cord.

In preferred practice, hard plastic-clad fibers (H-PCF), which have cladding formed from high rigidity plastic making them able to withstand bending (kinking) and resist rupture, are employed as the coated optical fibers 12. Optionally, both the core and the cladding are made of plastic.

The first protective tube 13 is formed of fluororesin having excellent non-adhesion, self-lubrication, and wear resistance. Examples of fluororesins preferred for forming the first protective tube 13 are polytetrafluoroethylene (PTFE) resin, or tetrafluoroethylene-ethylene copolymer (EFTE) resins, which feature excellent corrosion resistance. The first protective tube 13 has an outside diameter of 1.0 mm, for example.

The electric wires 15 that are signal wires have a conductor 0.30 mm in diameter obtained by twisting together seven strands 0.1 mm in diameter of tin-plated annealed copper wire or copper alloy wire, for example. By covering the conductor with an insulating sheath having thickness of 0.14 mm, an electric wire 15 having diameter of 0.58 mm is obtained. The electric wires 15 that are power wires have a conductor 0.38 mm in diameter obtained by twisting together seven strands 0.127 mm in diameter of tin-plated annealed copper wire or copper alloy wire, for example. By covering the conductor with an insulating sheath having thickness of 0.1 mm, an electric wire 15 having diameter of 0.58 mm is obtained. As the material of the sheath of the electric wires 15, for both the signal wires and the power wires, it is preferable to use polytetrafluoroethylene (PFA) resin having excellent qualities such as heat resistance, chemical resistance, non-adhesion, self-lubrication, etc.

For the overall wrapping 18, resin tape made from polyethylene terephthalate (PET) is used owing to its excellent qualities such as heat resistance and wear resistance. The inside diameter of the portion wrapped with the overall wrapping 18 is 2.2 mm, for example. The shield layer 19 is woven from tin-plated copper alloy wire 0.04 mm in diameter, for example. The sheath 20 is made, for example, of flame retardant polyethylene resin having thickness of 0.25 mm and outside diameter of 3.0 mm.

Figure 2:
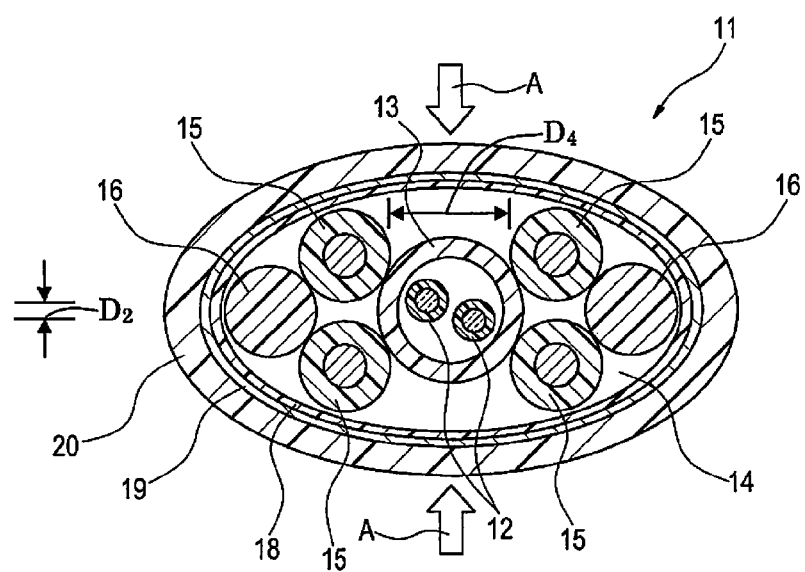
FIG. 2 is a cross sectional view showing a flexed portion when the cable of FIG. 1 is flexed.

FIG. 2 is a cross sectional view showing a flexed portion when the composite optical fiber cable 11 is flexed, or in a flexed state. In the flexed portion, the composite optical fiber cable 11 is deformed at the sheath 20 to elliptical shape viewed in cross-section, with the cross sectional shape being collapsed and flattened in the direction of the arrows A. Thereupon, the electric wires 15 which are shiftably disposed about the perimeter of the first protective tube 13 are pushed in the direction of the arrows A in association with deformation of the sheath 20, and shift in the circumferential direction of the first protective tube 13 and in the direction of the major axis of the ellipse so as to slide along the outside peripheral face of the first protective tube 13. In association with shifting of the electric wires 15, the tensile fibers 16 shift within the enclosed space 14 as well. Due to this shifting of the electric wires 15 and the tensile fibers 16, the electric wires 15 and the tensile fibers 16 are prevented from crushing the first protective tube 13. Therefore, lateral pressure can be prevented from acting on the coated optical fibers 12 which are enclosed in the first protective tube 13, and increased transmission loss of the coated optical fibers 12 can be prevented. Further, as shown in FIG. 2, the two upper ones of the electric wires 15 are spaced apart from the two lower ones of the electric wires 15 by a second distance $D_2$ in the flexed state. The distance $D_1$ is greater than the distance $D_2$, showing that the electric wires 15 are spaced apart from one another and remain spaced apart from one another when moved from the non-flexed state shown in FIG. 1 to the flexed state shown in FIG. 2. Conversely, in the non-flexed state shown in FIG. 1, the two upper ones of the electric wires 15 are spaced apart from one another by a distance $D_3$. Similarly, in the non-flexed state the two lower ones of the electric wires 15 are spaced apart from one another by the distance $D_3$. As the composite optical fiber cable 11 moves to the flexed state shown in FIG. 2, the two upper ones of the electric wires 15 move away from one another. Similarly, the composite optical fiber cable 11 moves to the flexed state shown in FIG. 2, the two lower ones of the electric wires 15 move away from one another. As shown in FIG. 2 in the flexed state, the upper ones of the electric wires 15 are spaced apart from one another by a distance $D_4$. Similarly in the flexed state, the lower ones of the electric wires 15 are spaced apart from one another by the distance $D_4$. A simple comparison of FIGS. 1 and 2 shows that the distance $D_3$ is less than the outer diameter $D_0$ and the distance $D_4$ is greater than the outer diameter $D_0$. Hence, in movement from the non-flexed state to the flexed state, one of the electric wires 15 moves toward a second one of the electric wires 15 and moves away from a third one of the electric wires 15.

In particular, because the first protective tube 13 which encloses the coated optical fibers 12 is formed of a fluororesin having excellent non-adhesion and self-lubrication, the electric wires 15 and the tensile fibers 16 which are disposed about the perimeter slide easily over the outside peripheral face of the first protective tube 13, and readily shift inside the enclosed space 14. Thus, the coated optical fibers 12 are well protected. Also, because the electric wires 15 and the tensile fibers 16 are twisted loosely about the perimeter of the first protective tube 13, when the composite optical fiber cable 11 is flexed, no difference in line length arises between the inside and the outside of the bend.

Once the composite optical fiber cable 11 is no longer flexed, the sheath 20 recovers to a circular cross section (the condition shown in FIG. 1), and in association therewith, the electric wires 15 and the tensile fibers 16 which have been shifted towards the major axis direction of the ellipse due to flattening of the sheath 20 now return to their original positions disposed on the perimeter of the first protective tube 13.

Figure 3:
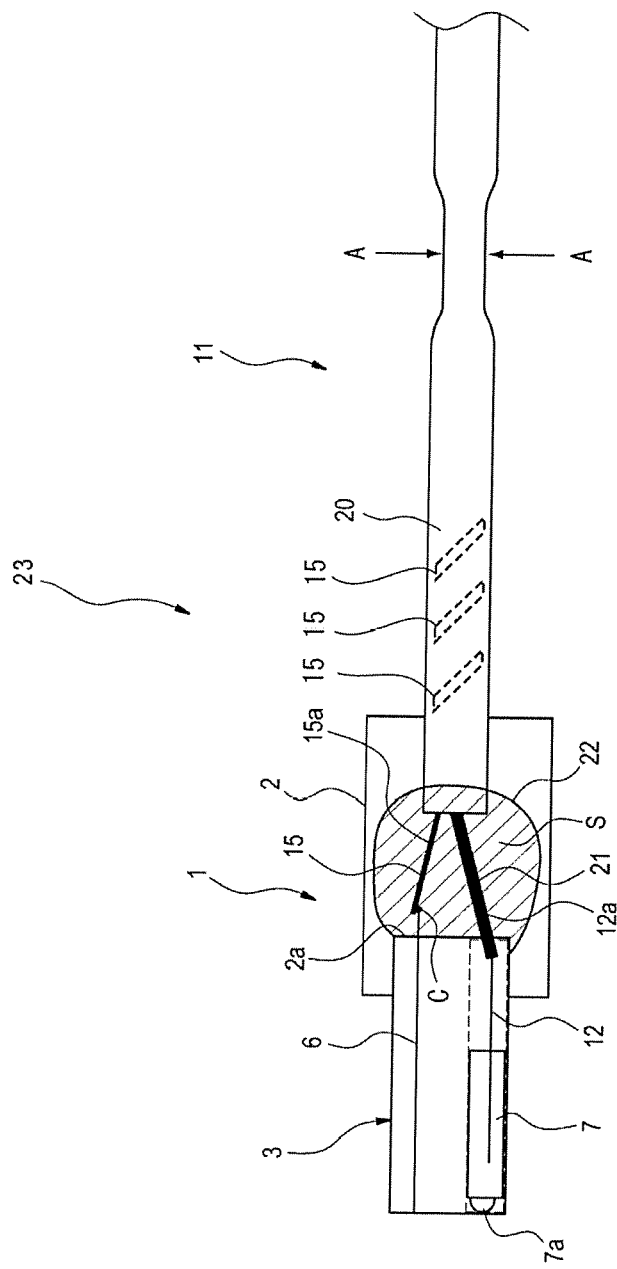
FIG. 3 is a partly sectional view showing an embodiment of the composite optical fiber cable assembly according to the invention.

FIG. 3 is a partly sectional view showing an embodiment of a composite optical fiber cable assembly 23 according to the invention. The composite optical fiber cable assembly 23 includes the composite optical fiber cable 11 and a connecting portion (connector 1) attached to an end thereof. The connector 1 is provided with a housing (housing 2) and with a terminal portion 3 that projects out from the distal end of the housing 2. The terminal portion 3 plugs into an adaptor of an electronic device, etc., not shown. For example, the composite optical fiber cable assembly 23 can be an interface cable used to connect a PC to various types of electronic devices for transmission of optical signals and electrical signals between these devices.

The terminal portion 3 has an electric terminal 6 and a ferrule 7. The conductor of the electric wire 15 is connected to the back end of the electric terminal 6. The coated optical fiber 12 (optical fiber) is inserted into the ferrule 7 from the back end side. The ferrule 7 has a fiber passage hole (not shown in the drawing) that is formed from the back end side towards the distal end, and the coated optical fiber 12 is inserted into and retained in the fiber passage hole.

The ferrule 7 is made of transparent hard resin, and a convex lens portion 7a is formed in its distal end part. When a signal beam exits the coated optical fiber 12, the signal beam is transmitted by being emitted from the convex lens portion 7a onto a photoreceptor portion on the adaptor side. When a signal beam is emitted from the adaptor side, the signal beam impinges on the optical fiber 12 via the convex lens portion 7a.

Inside the housing 2, the coated optical fiber 12 is exposed from the sheath 20 and is inserted into the ferrule 7 of the terminal portion 3, while the electric wire 15 is exposed from the sheath 20 and is wired to the electric terminal 6. The respective wiring portions 12a, 15a of the coated optical fiber 12 and the electric wire 15 are disposed within a common space S that is defined between the end part of the sheath 20 and an end plate 2a at the back end side of the terminal portion 3 inside the housing 2.

The coated optical fiber 12, in at least the portion thereof that is disposed inside the space S, is covered by a wiring portion protective tube (second protective tube) 21. The portion of the first protective tube 13 which covers the coated optical fiber 12 inside the sheath 20 can be employed in unmodified form as the second protective tube 21. For example, the second protective tube 21 can be provided by extending the first protective tube 13 out towards the end to a location such that the wiring portion 12a of the coated optical fiber 12 is covered. During terminal processing of the coated optical fiber 12, the second protective tube 21 can be provided by positioning the first protective tube 13 stripping location on the ferrule 7 side, while leaving the first protective tube 13 in place on the wiring portion 12a of the coated optical fiber 12. Optionally, a short second protective tube 21 separate from the first protective tube 13 can be attached from the distal end side to the end of the coated optical fiber 12 which connects to the ferrule 7.

The connecting portion C of the electric terminal 6 and the electric wire 15, and the coated optical fiber 12 covered by the second protective tube 21, which have been disposed in the common space S, are unified through molding with a resin 22.

According to this composite optical fiber cable assembly 23, in the wiring portions 12a, 15a of the coated optical fiber 12 and the electric wire 15 which are disposed within the common space S, the coated optical fiber 12 is covered by the second protective tube 21, whereby direct contact of the electric wire 15 with the coated optical fiber 12 can be prevented. Moreover, during the wiring operation to connect the electric wire 15 to the electric terminal 6 through soldering, direct contact of the metal wire 15 or tool with the coated optical fiber 12 of the wiring portion 12a can be prevented.

During the process of filling the space S with resin and molding it, damage to the coated optical fiber 12 by direct contact with the resin 22 can be prevented as well. Consequently, damage or increased transmission loss of the coated optical fiber 12 due to contact of the electric wire 15, etc., with the coated optical fiber 12 can be prevented, to obtain a highly reliable composite optical fiber cable assembly 23 that maintains good transmission characteristics.

Additionally, the wiring portion 12a can be further protected by the resin 22. Moreover, the connecting portion C of the electric wire 15 to the electric terminal 6 can be protected by the resin 22. Also, outside forces are prevented from acting on the wiring portion 12a of the coated optical fiber 12 or on the connecting portion C of the electric wire 15 and the electric terminal 6, thereby ensuring good transmission characteristics of the coated optical fiber 12 and high connection reliability of the connecting portion C of the electric wire 15.

Further, it is possible for the coated optical fiber 12 to shift to some extent in the axial direction within the second protective tube 21. Consequently, even if the coated optical fiber 12 experiences displacement in the lengthwise direction due to springback of the coated optical fiber 12, the electric wire 15, or the sheath 20, etc., displacement thereof can be allowed inside the second protective tube 21. Excessive tension caused by springback or the like is thereby prevented from acting on the coated optical fiber 12, and damage or increased transmission loss of the coated optical fiber 12 due to the action of excessive tension can be prevented as well.

While the preceding embodiment described an example of a composite optical fiber cable assembly 23 in which the connecting portion is the connector 1, optionally, the connecting portion can have a relay portion that includes an electric cable, an electric connector provided at one end of the electric cable, and a light module provided at the other end of the electric cable, for connection to the composite optical fiber cable. In this case, the coated optical fiber 12 can connect to the ferrule of the light module inside the relay portion. The electric wire 15 can either connect to a board inside the relay portion, or pass through the relay portion and connect directly to the electric connector. In the composite optical fiber cable assembly having this relay portion, the wiring portion 12*a* of the coated optical fiber 12 which is wired to the ferrule and the wiring portion 15*a* of the electric wire 15 which is wired to the electric connector or to the board inside the relay portion are disposed inside the common space S inside the relay portion. In this composite optical fiber cable construction, at least the wiring portion 12*a* that lies inside the common space S inside the relay portion is covered by the second protective tube 21.

While the preceding embodiment described an example of a multicore type cable in which a plurality (two) coated optical fibers 12 are enclosed in the first protective tube 13, a single core type in which a single coated optical fiber 12 is enclosed in the first protective tube 13 is also acceptable. Likewise, the numbers of electric wires 15 and tensile fibers 16 are not limited to those taught in the preceding embodiment. The enclosed space 14 can contain the electric wires 15 only, omitting the tensile fibers 16.

What is claimed is:

1. A composite optical fiber cable comprising:
   a flexible sheath having an elongated cylindrical shape;
   a first protective tube disposed within the sheath and extending the length of the sheath, the first protective tube being centrally located within the sheath viewed in cross-section;
   a plurality of optical fibers disposed within the first protective tube extending the length of the first protective tube and the sheath; and
   electric wires disposed within the sheath extending the length of the sheath and arranged between an inner surface of the sheath and an outer surface of the first protective tube such that the electric wires are spaced apart from one another in the circumferential direction, each of the electric wires having an outer diameter,
   the composite optical fiber cable being movable from a non-flexed state to a flexed state, such that in the non-flexed state a first one of the electric wires is spaced apart from a second one of the electric wires by a first distance greater than the outer diameter of the electric wires with the plurality of optical fibers being spaced apart from one another within the first protective tube, and in the flexed state the first one of the electric wires is spaced apart from the second one of the electric wires by a second distance smaller than the outer diameter with the plurality of optical fibers remaining spaced apart from one another within the first protective tube, wherein
   in the flexed state, a flexed portion of the composite optical fiber cable is deformed at the sheath to an elliptical shape as viewed in cross-section such that the plurality of the electric wires are movable in the circumferential direction of the first protective tube and in the direction of a major axis of the elliptical shape in order to prevent lateral pressure due to movement from the non-flexed state to the flexed state from acting on the plurality of optical fibers within the first protective tube.

2. The composite optical fiber cable according to claim 1, wherein
   at least an outer surface of the first protective tube is formed with a fluororesin.

3. The composite optical fiber cable according to claim 2, wherein
   the electric wires are arranged in a twisted manner about the perimeter of the first protective tube defining a helical shape.

4. The composite optical fiber cable according to claim 1, wherein
   the electric wires are arranged in a twisted manner about the perimeter of the first protective tube defining a helical shape.

5. The composite optical fiber cable according to claim 1, wherein
   the electric wires are arranged within the sheath such that in response to flexing of the composite optical fiber cable, the electric wires move in circumferential directions relative to the first protective tube causing the sheath to elastically deform from a circular shape to an elliptical shape in the area of the flexing with the first protective tube retaining a generally circular shape when viewed in cross-section.

6. The composite optical fiber cable assembly comprising:
   a composite optical fiber cable according to claim 1,
   a housing having a hollow interior, the housing being fixed to an open end of the composite optical fiber with an exposed portion of the optical fiber extending out of the sheath into the hollow interior of the housing, the electric wires also extend out of the sheath and into the hollow interior of the housing; and
   a terminal portion fixed to the housing with exposed portion of the optical fiber being connected to a ferrule within the terminal portion and the electric wires being connected to electric terminals within the terminal portion.

7. The composite optical fiber cable assembly according to claim 6, wherein
   the hollow interior of the housing being filled with a resin such that the portions of the electric wires and the portion the optical fiber that extend through the housing are surrounded by and integrally molded to the terminal portion and the hollow interior of the housing by the resin.

8. The composite optical fiber cable according to claim 1, wherein
   in the non-flexed state the sheath has a circular shape and in the flexed state the sheath has an elliptical shape in the area of the flexing with the first protective tube retaining a generally circular shape when viewed in cross-section.

9. The composite optical fiber cable according to claim 1, wherein
   with the composite optical fiber cable in the non-flexed state, the first one of the electric wires is spaced apart from a third one of the electric wires adjacent to the first one of the electric wires by a third distance and
   with the composite optical fiber cable in the flexed state, the first one of the electric wires is spaced apart from the third one of the electric wires by a fourth distance, the third distance being less than the outer diameter of the electric wires and the fourth distance being greater than the outer diameter of the electric wires.

10. The composite optical fiber cable according to claim 9, further comprising
    a tensile fiber disposed within the sheath circumferentially located between the first one of the electric wires and the second one of the electric wires.

11. The composite optical fiber cable according to claim 1, further comprising a tensile fiber disposed within the sheath circumferentially located between the first one of the electric wires and the second one of the electric wires.

12. The composite optical fiber cable according to claim 1, wherein
the plurality of optical fibers are hard plastic-clad fibers having a cladding formed from plastic or plastic optical fibers having a core and a cladding both made of plastic.

* * * * *